US012515915B2

(12) United States Patent
Harel

(10) Patent No.: US 12,515,915 B2
(45) Date of Patent: Jan. 6, 2026

(54) SABBATH ELEVATOR

(71) Applicant: Sagie Harel, Nili (IL)

(72) Inventor: Sagie Harel, Nili (IL)

( * ) Notice: Subject to any disclaimer, the term of this patent is extended or adjusted under 35 U.S.C. 154(b) by 1353 days.

(21) Appl. No.: 17/184,627

(22) Filed: Feb. 25, 2021

(65) Prior Publication Data

US 2021/0261382 A1 Aug. 26, 2021

(30) Foreign Application Priority Data

Feb. 25, 2020 (IL) .......................................... 272899

(51) Int. Cl.

*B66B 1/44* (2006.01)
*B66B 1/28* (2006.01)
*B66B 11/00* (2006.01)
*B66B 17/12* (2006.01)

(52) U.S. Cl.

CPC .................. *B66B 1/44* (2013.01); *B66B 1/28* (2013.01); *B66B 11/007* (2013.01); *B66B 17/12* (2013.01)

(58) Field of Classification Search

CPC ........... B66B 1/44; B66B 1/28; B66B 11/007; B66B 17/12; B66B 1/3476; B66B 11/0226; B66B 1/302; Y02B 50/00
See application file for complete search history.

(56) References Cited

U.S. PATENT DOCUMENTS 3,845,842 A * 11/1974 Johnson .................. B66B 17/12 187/401
6,742,634 B2 6/2004 Watanabe
8,499,895 B2 8/2013 Zweig
8,893,858 B2 11/2014 Shi
9,481,548 B2 11/2016 Siddiqui
9,580,276 B2 2/2017 Toutaoui
9,709,075 B2 7/2017 Yakuel
2004/0193518 A1 9/2004 Deplazes
2010/0126809 A1* 5/2010 Foschini ................ B66B 1/302 187/293
2011/0112943 A1 5/2011 Dietz
2011/0273283 A1 11/2011 Schmuttor
2013/0126277 A1 5/2013 Friedman
2014/0364272 A1* 12/2014 Shapira ................ B60W 10/08 477/3
2015/0096843 A1 4/2015 Siddiqui

FOREIGN PATENT DOCUMENTS

CN 102718100 A 10/2012
JP 10826631 A 1/1996
JP 2011026034 A 2/2011
JP 2014034451 A 2/2014

* cited by examiner

*Primary Examiner* — Jeffrey Donels
(74) *Attorney, Agent, or Firm* — AlphaPatent Associates Ltd.; Daniel J. Swirsky

(57) ABSTRACT

A method of operating an elevator, the elevator having an elevator car, a motor, a controller and a counterweight (CW), the method including, for ascending of the elevator car when loaded with passengers, providing a car occupancy limiter (COL) and activating the COL by the controller for ensuring that the loaded car weighs less than the CW and controlling by the controller of the motor to not use motor rotational power; and for descending of the elevator car when loaded with passengers, where the loaded car weighs more than the CW, controlling by the controller of the motor to not use motor rotational power.

19 Claims, 14 Drawing Sheets

SABBATH ELEVATOR

FIELD

Embodiments disclosed herein relate to elevators and particularly for elevators operating in accordance with Jewish Sabbath observance.

BACKGROUND

Orthodox Jews who observe the Sabbath (also referred to herein as Shabbat) avoid performing those activities that are regarded as prohibited for the duration of the Sabbath. The operation of an electrical appliance or any change in the operation of an electrical appliance is prohibited. Therefore, in order to use an elevator on Sabbath, the elevator must be modified in order for its use to be considered permitted. A Sabbath elevator generally stops at every floor or most floors going up or down or in both directions. In this way observant Jews can use the elevator without pushing any buttons. Additionally, the door obstruction detection mechanism is typically disabled while the door is open, with a buzzer sounding to warn users that the mechanism is about to reactivate, and the doors are about to close.

While these adaptations are considered acceptable to many orthodox Jews who use these Sabbath elevators, some Jewish orthodox groups have concerns about usage of current Sabbath elevators including:

- Concern that the Sabbath mode will be deactivated and then reactivated, or activated after the start of the Sabbath;
- Concern that a repair was made to the elevator by a Jew on the Sabbath.

These concerns are described, and solutions proposed, in patent applications IL254691 and U.S. Pat. No. 16,140,566 by the same Applicant incorporated by reference as if fully set forth herein.

In addition to the above concerns, there are other aspects of elevator operation on Sabbath that prevent acceptance by all orthodox Jewish groups. These aspects include:

- The increase in energy (electricity) usage required for moving the elevator as passengers enter into and are added to the weight of the elevator (a decrease in energy usage is not considered problematic);
- Activation of the load/weight sensor/s of the elevator;
- Activation of the electronics in the tachometer/encoder;
- Additional electricity generated by the lift motor when the car pulls on the motor;
- The stretching of the cables due to the weight of elevator car and passengers may cause the cables to lengthen and the cabin to subside under a floor level after stopping causing activation of the motor to raise the car up to a level position;
- Activation of the door buzzer prior to closing of the elevator doors.

There is therefore a need for Sabbath elevator that prevents increase in electricity usage as well as activation of various electronic components such that the Sabbath elevator will be acceptable for usage by all Sabbath observant Jews.

SUMMARY

The present disclosure overcomes the drawbacks of the prior art by providing a Sabbath elevator with mechanisms to prevent increase in electricity usage as well as altering the activation of various electronic components in ways that permit usage of the Sabbath elevator by observant Jews. To prevent an increase in the use of electricity above the usage for an empty ascending or descending elevator, minimized usage is made of the elevator motor to move the elevator car. Instead, the system ensures that the direction of travel of the elevator car is enabled by the gravitational pull on either the counterweight (for ascending car) or the car (for descending car). Thus, when the car is ascending, the counterweight will be heavier such that it pulls the car upwards as the counterweight is pulled down by gravity and no motor rotational energy is used. When the car is descending with passengers, but where the counterweight is still heavier, the motor rotational energy used is less than the energy used when no passengers are present since passengers are making the car heavier. When the car is descending loaded with passengers, and the loaded car is heavier than the counterweight, no motor rotational energy is used, and the loaded car pulls the counterweight upwards as the car is pulled down by gravity.

Additionally and alternatively, the frequency controller is programed to keep the energy usage below the maximum used by an empty car and also at a stable energy usage level that is adjusted according to the car weight. The stable energy usage is achieved by adjusting the car speed to less than or equal to the car nominal speed depending on the car weight. The lowered speed is achieved by limiting the motor rotational speed thus limiting the motor rotational power used. Car movement at lower speed powered by the motor therefore uses less energy than for an empty car.

It should be appreciated that while the approaches as described herein are used for Sabbath mode of the elevator, that the mechanism proposed may also be used to generally reduce the energy usage of an elevator.

The Sabbath elevator includes means to ensure that the weight of the car plus passengers is kept below the weight of the counterweight on Shabbat for ascending and optionally for descending travel. In some embodiments, the means includes a car occupancy limiter (COL). In some embodiments, the COL is deployed only when the elevator is ascending. In some embodiments, the COL is deployed in both directions. Advantageously, the COL ensures that electricity generation from turning of the motor does not exceed the energy generated from the motor by the counterweight.

An embodiment of the COL as contemplated herein includes a deployable barrier such as but not limited to inner doors inside the Sabbath elevator that closes off part of the Sabbath elevator to therefore reduce the amount of space that passengers can occupy and thus the weight contribution of passengers. In addition to resolving the passenger weight issue for a Shabbat elevator, the Sabbath elevator of the present disclosure includes several further enhancements to ensure religious compliance of those using the elevator:

- The weight sensor operates continually regardless of the entry of passengers into the elevator car. As a non-limiting example, the weight sensor system weighs the cabin every tenth of a second and hence does not perform any additional operation caused by the entry of a passenger into the elevator car. In some embodiments, the weight sensor is disabled during Shabbat mode or is enabled only when the car doors are closed;
- In some embodiments, a mechanical weight sensor is used that displays the weight of the elevator car with passengers to the passengers so that they will understand if they are causing an overweight situation and leave the car;
- The tachometer encoder is a contactless tachometer and uses, for example, an optical sensor to detect rotational movement instead of an electrical contact mechanism;

- The door-close indicator utilizes an optical (light) indication instead of a noise-based indication such as the commonly used buzzer;
- In some embodiments, electromagnets are provided on the elevator car shoes and are activated to hold onto the elevator rails as the elevator car reaches a floor such that the elevator car stops level with the floor (and does not subside beneath the floor) so that the motor does not need to use energy to pull the elevator car up level with the floor. It should be appreciated that this features may prevent the elevator relevelling function that is prohibited according to religious Orthodox Jews.
- Use of the system and method of IL254691 (U.S. Pat. No. 16,140,566) to ensure maintenance and activation of the Sabbath elevator according to accepted Jewish orthodox practice.

In some embodiments, a method of operating an elevator, the elevator includes an elevator car, a motor, a controller and a counterweight (CW), the method includes: for ascending of the elevator car when loaded with passengers, providing a car occupancy limiter (COL) and activating the COL by the controller for ensuring that the loaded car weighs less than the CW. In some embodiments, the method further includes: for ascending of the elevator car when loaded with passengers, controlling by the controller of the motor to not use motor rotational power. In some embodiments, the method further includes: for descending of the elevator car when loaded with passengers, wherein the loaded car weighs more than the CW, controlling by the controller of the motor to limit the motor rotational speed so as to limit the motor rotational power.

In some embodiments, the motor energy used in either of ascending or descending is less than the energy that would be used by an empty car. In some embodiments, the COL is activated by the controller after ensuring that there are no passengers inside the car. In some embodiments, the elevator includes a weight sensor, the method further includes, when Shabbat mode is activated, by the controller, disabling the weight sensor or enabling the weight sensor only when car doors are closed. In some embodiments, the elevator further includes a mechanical weight sensor that provides an indication visible to the passengers of the combined weight of the car and passengers relative to the CW.

In some embodiments, the elevator further includes an electromagnet and wherein the electromagnet is activated by the controller to engage with elevator rails so that an elevator door threshold will not subside under a floor level. In some embodiments, the COL includes a deployable barrier inside the elevator car for defining a limited occupancy area.

In some embodiments, an elevator includes: an elevator car; a counterweight (CW); and a car occupancy limiter (COL) for preventing the weight of the car and passengers from exceeding the weight of the CW. In some embodiments, the elevator further includes a controller controlling operation of the elevator configured such that: for ascending of the elevator car when loaded with passengers, activating the COL and not using motor rotational power or limiting the motor rotational speed so as to limit the motor rotational power.

In some embodiments, the COL includes a deployable barrier inside the elevator car for defining a limited occupancy area. In some embodiments, the COL further includes an occupancy sensor. In some embodiments, the elevator further includes a visual door close indicator. In some embodiments, the elevator further includes a mechanical weight sensor that provides an indication visible to the passengers of the elevator of the combined weight of the car and passengers relative to the CW. In some embodiments, the elevator further includes a weight sensor, wherein the controller is configured, when Shabbat mode is activated, to disable the weight sensor or to enable the weight sensor only when car doors are closed.

In some embodiments, the elevator further includes an electromagnet configured to be activated by the controller to engage with elevator rails so that an elevator door threshold will not subside below a floor level. In some embodiments, the elevator further includes a distance measurement device for determining the position of the car in a lift shaft. In some embodiments, the distance measurement device is one of an optical distance measurement device, or a cable measuring device.

In some embodiments, a method is provided of operating a Sabbath elevator on the Sabbath, the Sabbath elevator including an elevator car, a motor, a controller, and a counterweight (CW), the method including: for ascending of the elevator car when loaded with passengers, providing and activating by the controller of a car occupancy limiter (COL) for ensuring that the loaded car weighs less than the CW and, by the controller, limiting the motor rotational speed so as to limit the motor rotational power. In some embodiments, motor energy used in either of ascending or descending is less than energy that would be used by an empty car.

In some exemplary embodiments a method of operating a Sabbath elevator on the Sabbath, the Sabbath elevator including an elevator car, a motor and a counterweight (CW), the method includes: for ascending of the elevator car when loaded with passengers, providing means for ensuring that the loaded car weighs less than the CW and not using motor rotational power; and for descending of the elevator car when loaded with passengers, wherein the loaded car weighs more than the CW, not using motor rotational power.

In some embodiments, the motor energy used in either of ascending or descending is less than the energy that would be used by an empty car. In some embodiments, the motor energy used includes braking energy. In some embodiments, the means for ensuring that the loaded car weighs less than the CW includes providing a car occupancy limiter (COL) and activating the COL during ascending of the car. In some embodiments, the COL is deactivated during descending of the car.

In some embodiments, the elevator further includes a controller and elevator operation is controlled by the controller, wherein elevator operation includes motor operation and COL activation and deactivation. In some embodiments, the COL is activated after ensuring that there are no passengers inside the car, by: providing a visual indication that all passengers must exit the car; closing the car doors and activating an occupancy sensor; when no passengers are detected by the occupancy sensor, activating the COL; and when passengers are detected by the occupancy sensor, opening the car doors and repeating the above steps until no passengers are detected.

In some embodiments, the elevator includes a weight sensor and a frequency controller, and the elevator weight sensor is disabled when Shabbat mode is activated and wherein an elevator frequency controller is used to monitor elevator weight by sensing the weight resistance. In some embodiments, the elevator further includes a mechanical weight sensor that provides an indication of the combined weight of the car and passengers visible to the passengers. In some embodiments, a boundary switch is provided below a lowest floor that the car stops at, wherein when car descends below the lowest floor boundary switch, the controller will activate the motor to pull the car back level with the lowest floor. In some embodiments, when passengers cause the car to be heavier than CW during ascending of the car, the motor will be activated to hold the car at the current floor, but not to power an ascent. In some embodiments, the car in Sabbath mode will stop at every floor or alternate floors while ascending. In some embodiments, the car in Sabbath mode will not stop during descent until the lowest floor.

In other exemplary embodiments a Sabbath elevator includes: an elevator car; a counterweight (CW); and means for preventing the weight of the car and passengers from exceeding the weight of the CW. a controller controlling operation of the elevator such that: for ascending of the elevator car when loaded with passengers, activating the means for preventing the weight of the car and passengers from exceeding the weight of the CW and not using motor rotational power; and for descending of the elevator car when loaded with passengers, wherein the loaded car weighs more than the CW, not using motor rotational power.

In some embodiments, the means for preventing the weight of the car and passengers from exceeding the weight of the CW includes a car occupancy limiter (COL). In some embodiments, the COL includes a deployable barrier inside the elevator car for defining a limited occupancy area. In some embodiments, the COL further includes an occupancy sensor. In some embodiments, the elevator further includes a visual door close indicator. In some embodiments, the elevator further includes a mechanical weight sensor visible to the passengers of the elevator. In some embodiments, the elevator further includes an elevator tachometer and wherein the elevator tachometer is a contactless tachometer.

In some embodiments, the contactless tachometer is an optical tachometer. In some embodiments, the controller includes a frequency controller. In some embodiments, the elevator further includes a weight sensor and wherein the weight sensor operates continually regardless of the entry of passengers into elevator car. In some embodiments, the weight sensor is disabled when Shabbat mode is activated. In some embodiments, the elevator further includes a boundary switch below the lowest floor that the car stops at. In some embodiments, In other exemplary embodiments a Sabbath elevator kit for retrofitting to an existing elevator, the kit includes one or more of: a controller; a frequency controller; a contactless tachometer; a Sabbath mode load sensor; means for preventing the weight of the car and passengers from exceeding the weight of the CW; a mechanical load sensor; a boundary switch, and a visual door close indicator. In some embodiments, the controller controls or integrates into an existing control panel of the existing elevator. In some embodiments, the means for preventing the weight of the car and passengers from exceeding the weight of the CW includes a car occupancy limiter (COL). In some embodiments, the COL includes a deployable barrier inside the elevator car for defining a limited occupancy area. In some embodiments, the COL further includes an occupancy sensor.

In other exemplary embodiments, a method of reducing the energy consumed by an elevator, the elevator including an elevator car, a motor and a counterweight (CW), the method includes: for ascending of the elevator car when loaded with passengers, ensuring that the loaded car weighs less than the CW and not using motor rotational power; and for descending of the elevator car when loaded with passengers, wherein the loaded car weighs more than the CW, not using motor rotational power. In some embodiments, the motor energy used in either of ascending or descending is less than the energy that would be used by an empty car. In some embodiments, the motor energy used includes braking energy. In some embodiments, the means for ensuring that the loaded car weighs less than the CW includes providing a car occupancy limiter (COL) and activating the COL during ascending of the car. In some embodiments, the COL is deactivated during descending of the car. In some embodiments, the COL includes a deployable barrier inside the elevator car for defining a limited occupancy area.

In other exemplary embodiments, a method of operating a Sabbath elevator on the Sabbath, the Sabbath elevator including an elevator car, a motor and a counterweight (CW), includes: for ascending of the elevator car when loaded with passengers, providing means for ensuring that the loaded car weighs less than the CW and limiting the motor rotational speed so as to limit the motor rotational power; and for descending of the elevator car when loaded with passengers, wherein the loaded car weighs more or less than the CW, limiting the motor rotational speed so as to limit the motor rotational power.

In some embodiments, motor energy used in either of ascending or descending is less than energy that would be used by an empty car. In some embodiments, the motor energy used includes braking energy. In some embodiments, the means for ensuring that the loaded car weighs less than the CW includes providing a car occupancy limiter (COL) and activating the COL during ascending of the car. In some embodiments, the COL is deactivated during descending of the car. In some embodiments, the elevator further includes a controller and elevator operation is controlled by the controller, wherein elevator operation includes motor operation and COL activation and deactivation.

The terms elevator or lift may be used interchangeably herein and have the same meaning. The terms Sabbath or Sabbath may be used interchangeably herein and have the same meaning, namely, the Jewish Sabbath observed from near sundown on Friday evening to around stars-out on Saturday night. The term Sabbath as used herein also refers to Jewish festivals or holy days having the same requirements for religious observance as the Sabbath.

Where passengers and load (weight) are described herein, this should be understood to include passengers and other articles associated with passengers or articles commonly transported in passenger elevators including but not limited to luggage, pets, trolleys, and so forth.

When describing the operation of the elevator motor herein, energy usage of the motor is said to be for "rotational" use when powering movement of the elevator car upwards or downwards and "braking" use when applying a resistive force to slow the elevator. It should be appreciated that both uses may be combined to alter the overall power used by the motor depending on the weight of the loaded or not-loaded elevator, the weight of the counterweight, the speed of travel and the direction of travel.

Unless otherwise defined, all technical and scientific terms used herein have the same meaning as commonly understood by one of ordinary skill in the art to which this disclosure belongs. The materials, methods, and examples provided herein are illustrative only and not intended to be limiting.

Implementation of the method and system of the present disclosure involves performing or completing certain selected tasks or steps manually, automatically, or a combination thereof. Moreover, according to actual instrumentation and equipment of embodiments of the method and system of the present disclosure, several selected steps could be implemented by hardware or by software on any operating system of any firmware or a combination thereof. For example, as hardware, selected steps of the disclosure could be implemented as a chip or a circuit. As software, selected steps of the disclosure could be implemented as a plurality of software instructions being executed by a computer using any suitable operating system. In any case, selected steps of the method and system of the disclosure could be described as being performed by a data processor, such as a computer for executing a plurality of instructions.

Although the present disclosure is described with regard to a “controller”, “computing device”, a “computer”, or “mobile device”, it should be noted that these devices and optionally any device featuring a data processor and the ability to execute one or more instructions may be described as a computer, including but not limited to any type of personal computer (PC), a server, a distributed server, a virtual server, a cloud computing platform, a cellular telephone, an IP telephone, a smartphone, or a PDA (personal digital assistant). Any two or more of such devices in communication with each other may optionally include a “network” or a “computer network”.

BRIEF DESCRIPTION OF THE DRAWINGS

The disclosure is herein described, by way of example only, with reference to the accompanying drawings. With specific reference now to the drawings in detail, it is stressed that the particulars shown are by way of example and for purposes of illustrative discussion of the embodiments of the present disclosure only, and are presented in order to provide what is believed to be the most useful and readily understood description of the principles and conceptual aspects of the disclosure. In this regard, no attempt is made to show structural details of the disclosure in more detail than is necessary for a fundamental understanding of the disclosure, the description taken with the drawings making apparent to those skilled in the art how the several forms of the disclosure may be embodied in practice. Like elements may be numbered with like numerals in different figures. In the figures.

DETAILED DESCRIPTION

Figure 1A:
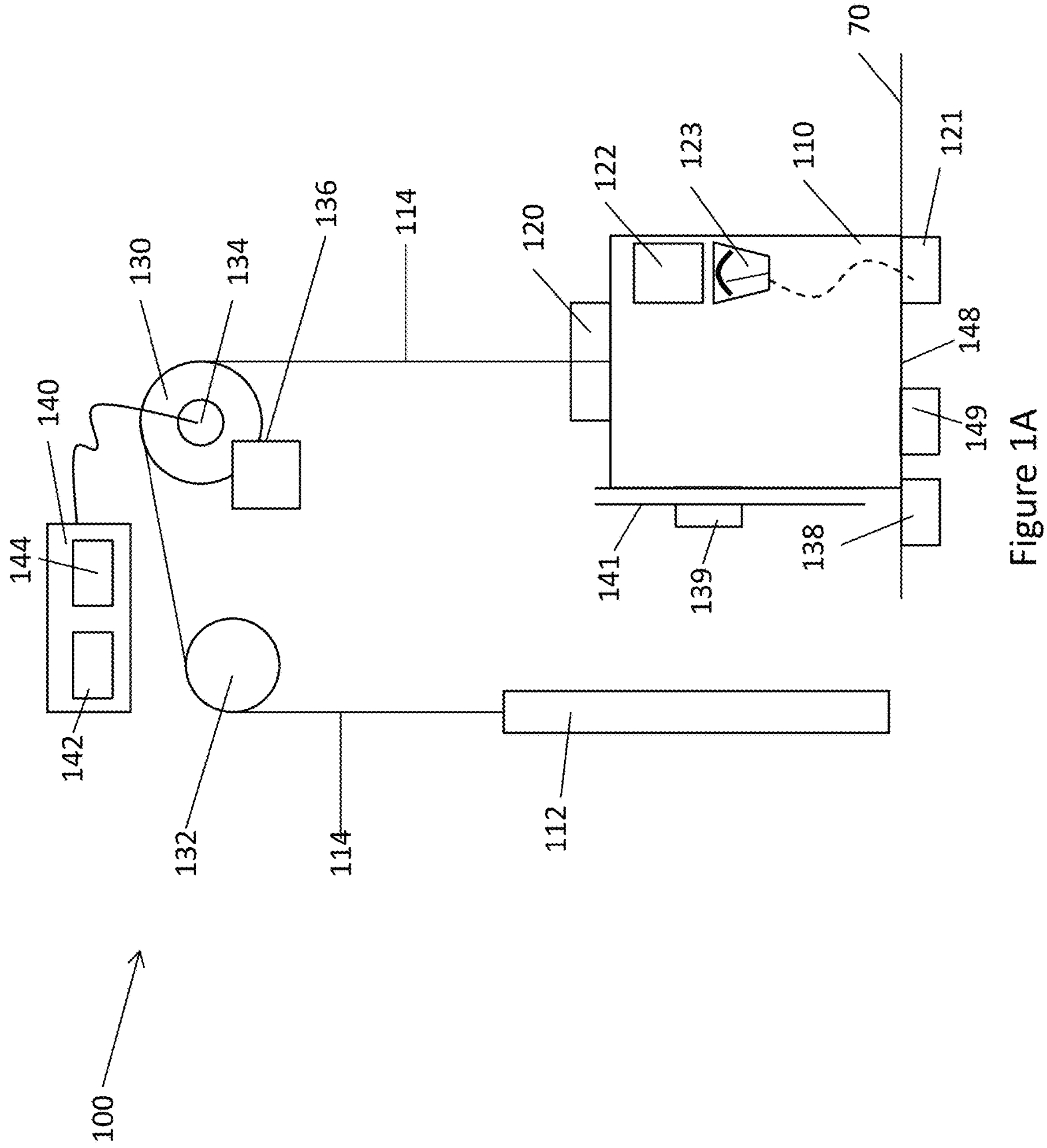
FIGS. 1A-1J are schematic diagrams and motor energy usage graphs of a Sabbath elevator according to at least some embodiments.
Figure 1B:
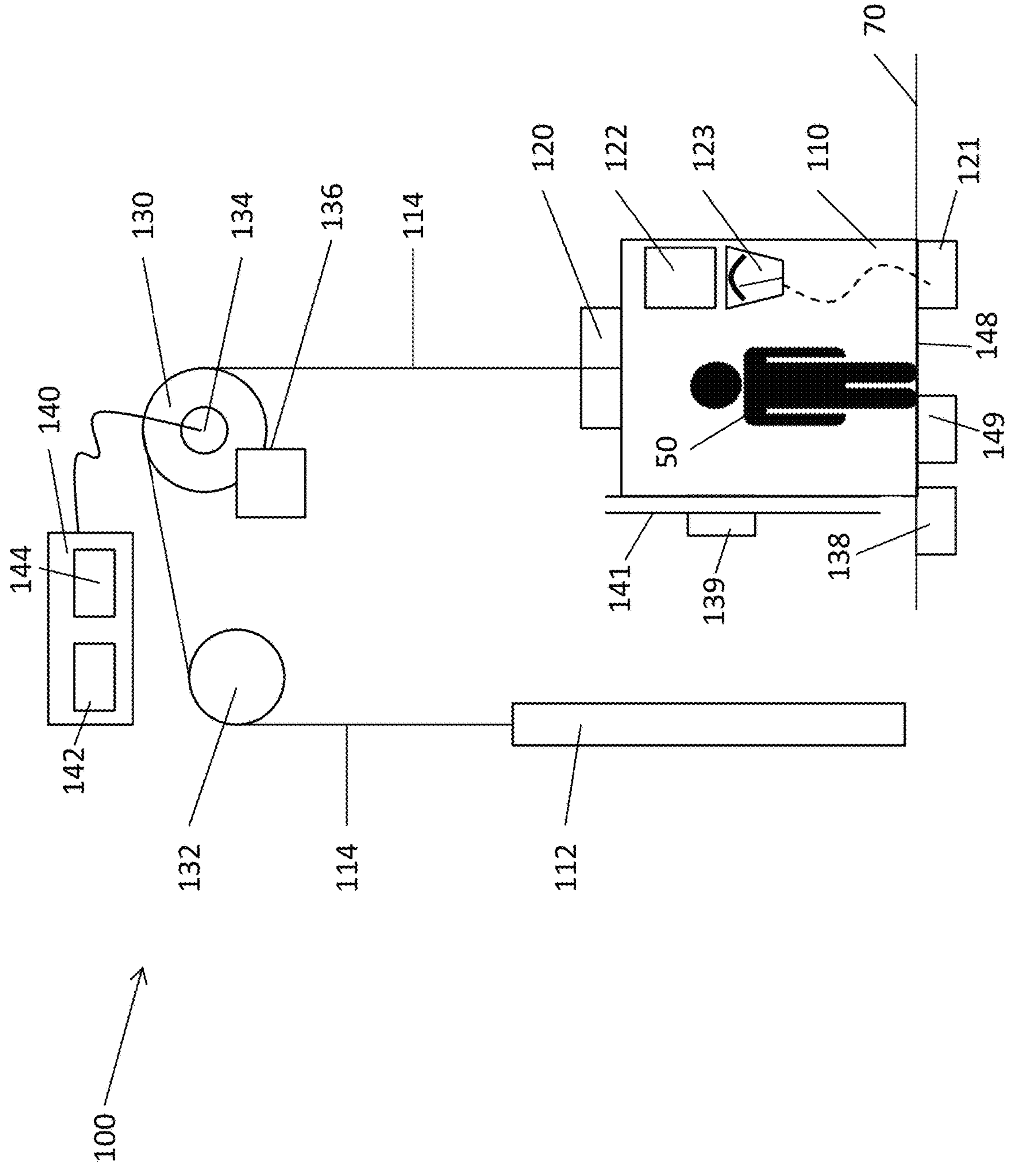

Exemplary embodiments disclosed herein relate to a Sabbath elevator suitable for use by observant Jews. Reference is now made to FIGS. 1A-1J which are schematic diagrams and motor energy usage graphs for a Sabbath elevator according to at least some embodiments of the present disclosure. As shown in FIGS. 1A and 1B a Sabbath elevator system 100 includes: an elevator car 110 guided by elevator rails 141 suspended by a cable 114 that passes over a motor 130 and pulley 132 and is attached on a distal side to a counterweight 112. System 100 includes an elevator braking system 136 (also referred to herein as mechanical brake 136) for mechanical (friction) braking of motor 130 such as when motor 130 is stopping or stopped. Motor 130 also provides powered braking by resisting the direction of rotation of the heavier of either of the counterweight 112 or car 110 pulled by gravity.

It should be appreciated that different motor/pulley/brake arrangements are possible, and the illustrated arrangement should not be considered limiting. It should be appreciated that elevator 100 also includes other components common to elevators known in the art and only those components related to the disclosure herein are described herein. In some embodiments, cable 114 includes multiple cables each connecting elevator car 110 to counterweight 112. When elevator car 110 descends, counterweight 112 ascends and vice versa.

Elevator 100 is controlled by a controller 140 for operating elevator 100. Controller 140 includes an elevator control panel 144 and a frequency controller 142 for smooth starting and stopping of motor 130. Frequency controller 142 may also be known as an elevator inverter or frequency inverter. Controller 140 may include the functionality of control panel 144 and frequency controller 142 in a single device. Controller 140 is a computing device as described herein. Controller 140 can activate or deactivate Sabbath mode. Controller 140 includes means for interaction (not shown) with controller 140 by a human operator but it should be appreciated that the activation, monitoring, and operation of elevator components described herein is performed by controller 140 operating autonomously.

Tachometer/encoder 134 provides data about the rotation of motor 130 to controller 140. In some embodiments, tachometer 134 is a contactless tachometer. In some embodiments, tachometer 134 is an optical tachometer. In some embodiments, optical tachometer 134 uses a light source and optical sensor for detecting rotation by directing the light source at any one of one or more reflective strips, or one or more holes on the rotating component and detecting changes in the reflected light by the optical sensor to thereby convert the detected changes into a measured rotational speed. Tachometer 134 is in data communication with controller 140. Tachometer 134 may also be used to estimate the position of car 110 in a lift shaft. In some implementations, system 100 includes a floor sensor mechanism 149 for determining whether a lower door threshold 148 is level with a floor that car 110 stops at.

Figure 1C:
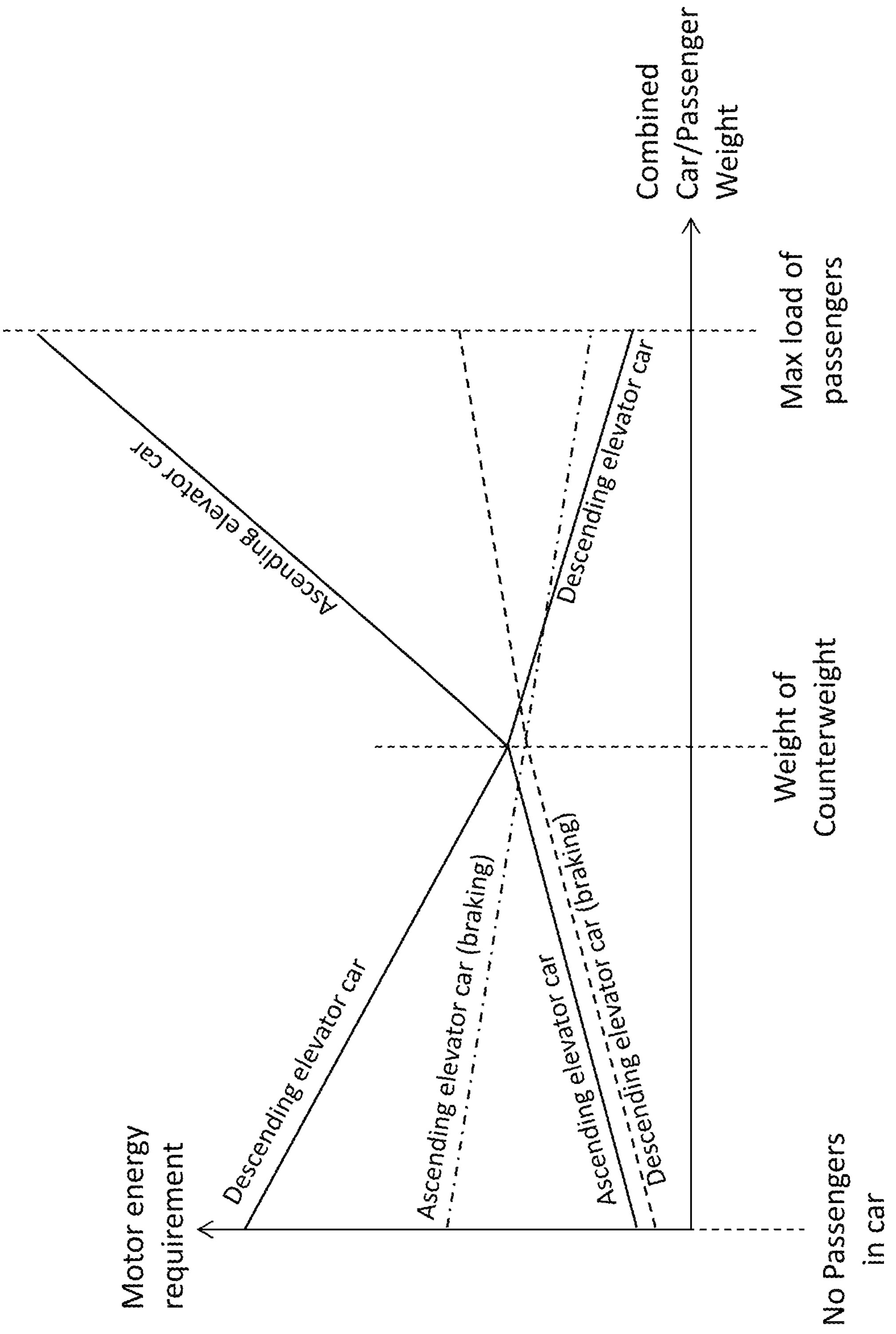
Figure 1D:
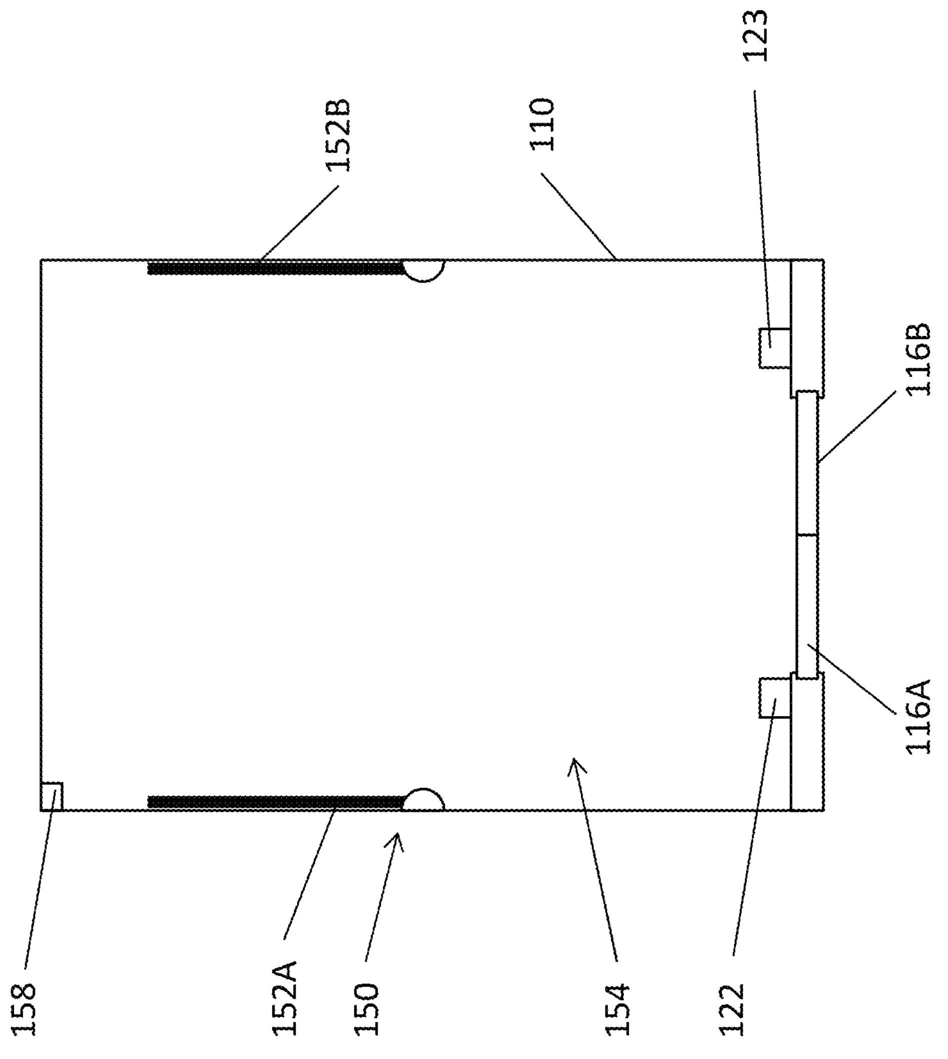
Figure 1E:
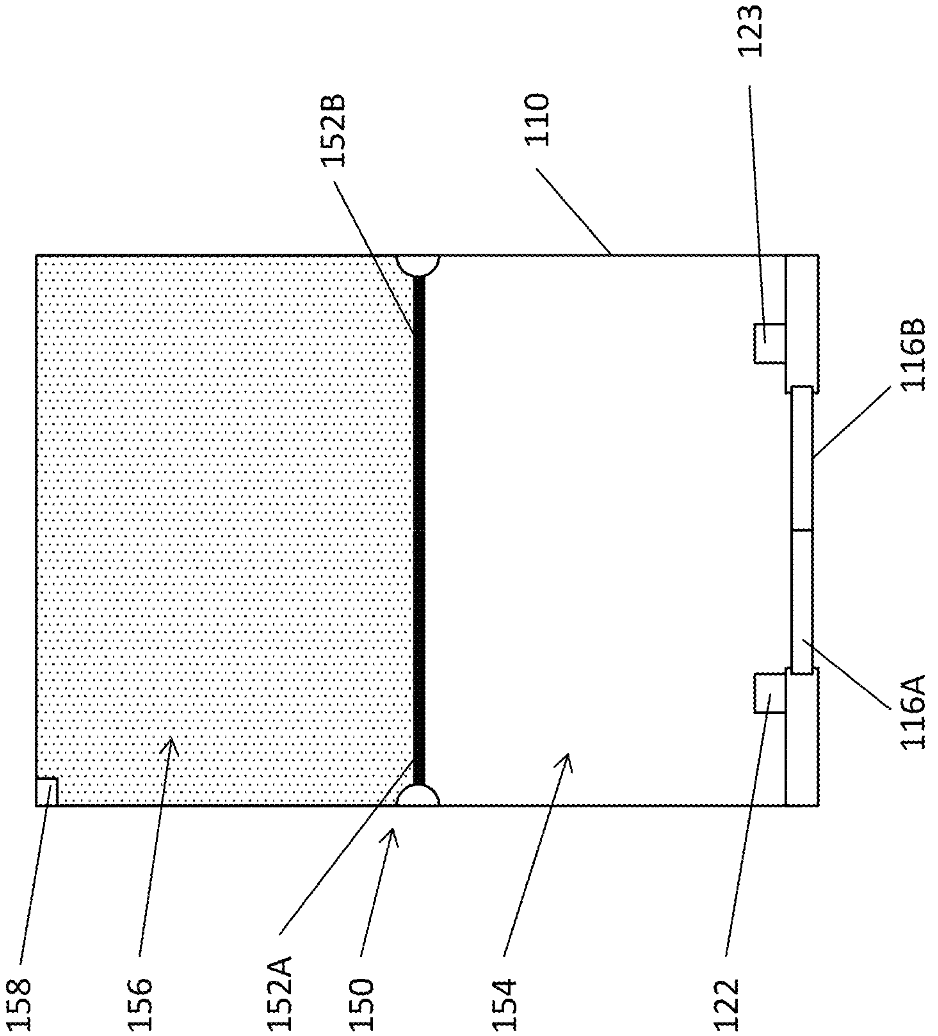
Figure 1F:
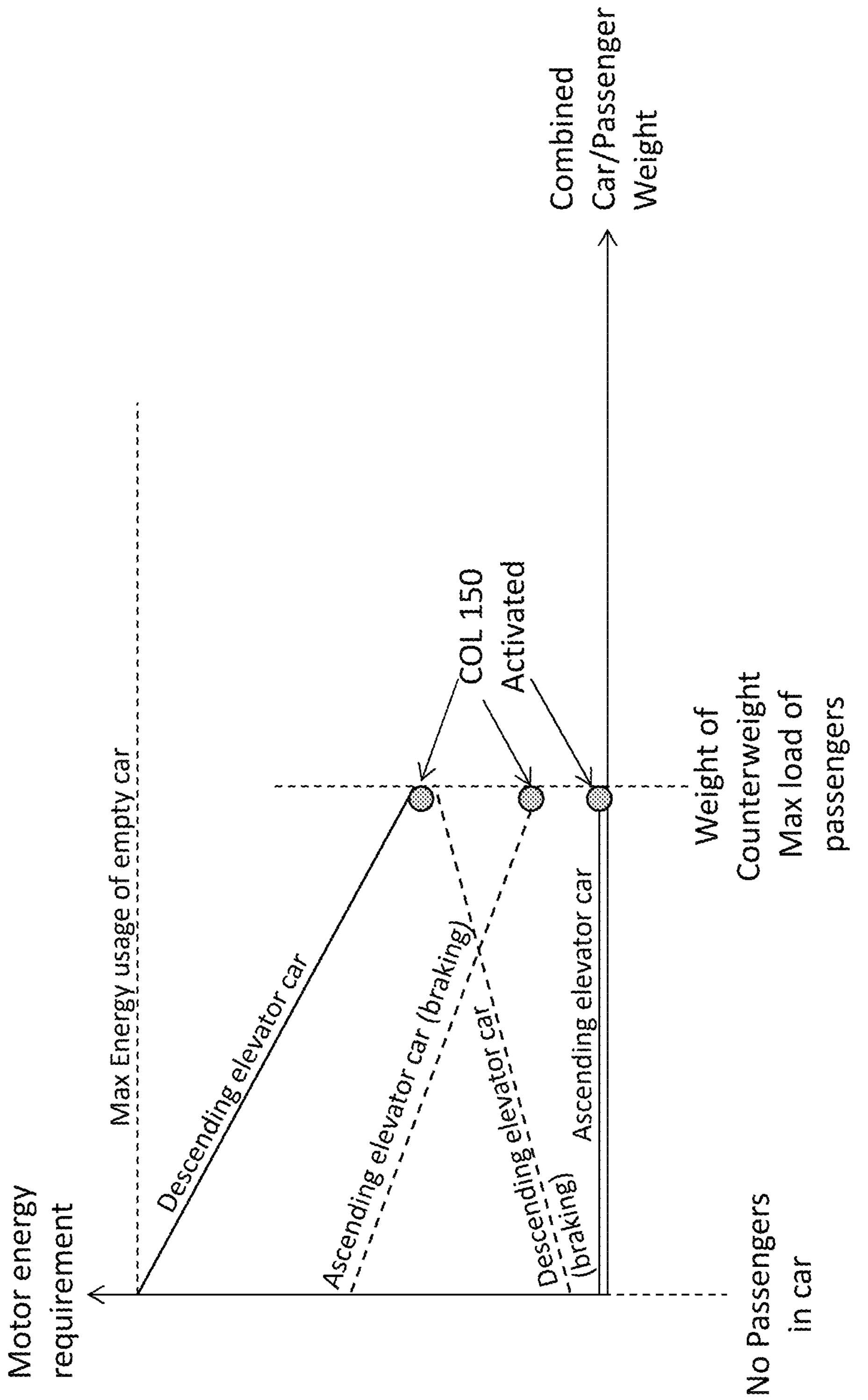
Figure 1G:
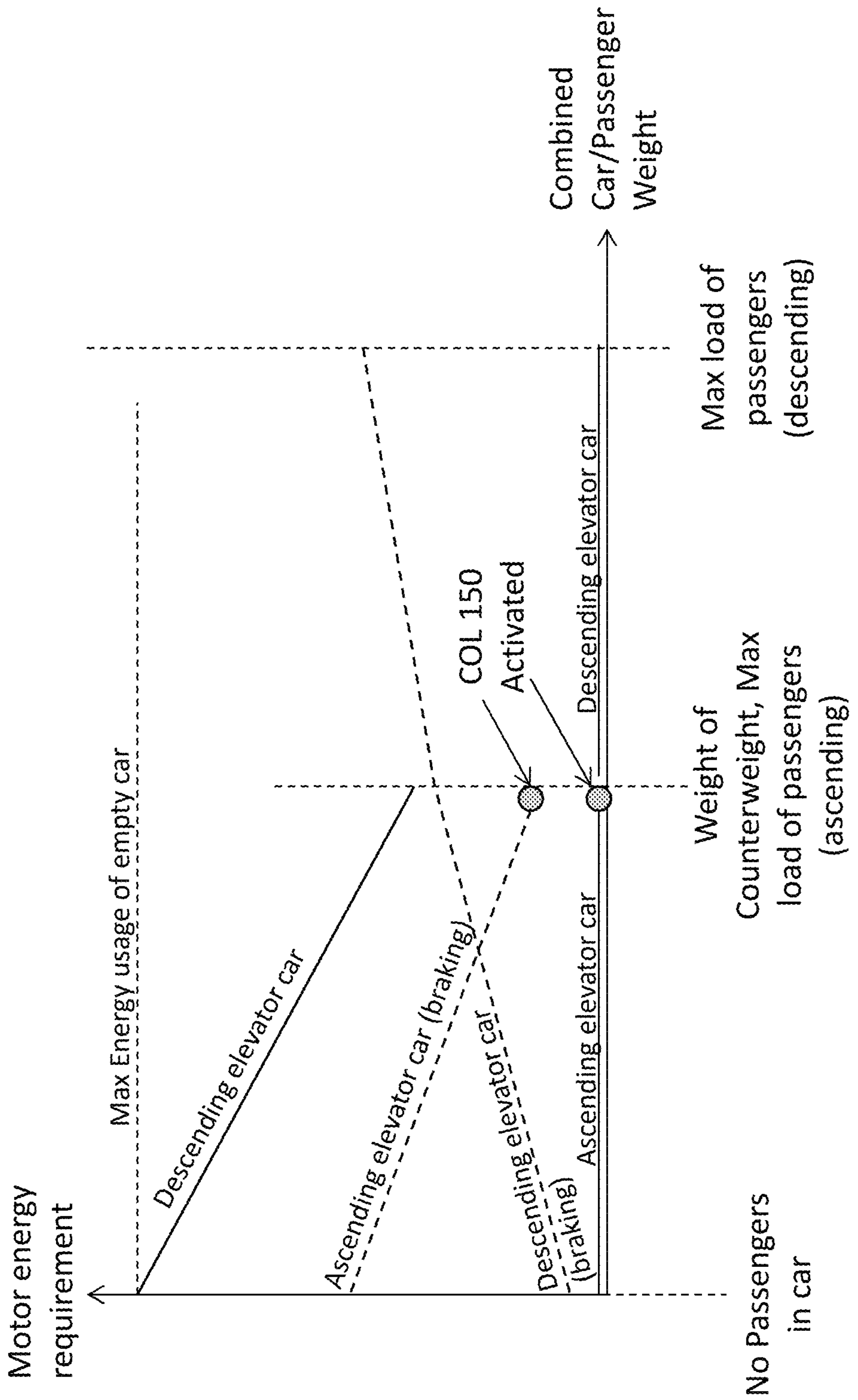
Figure 1H:
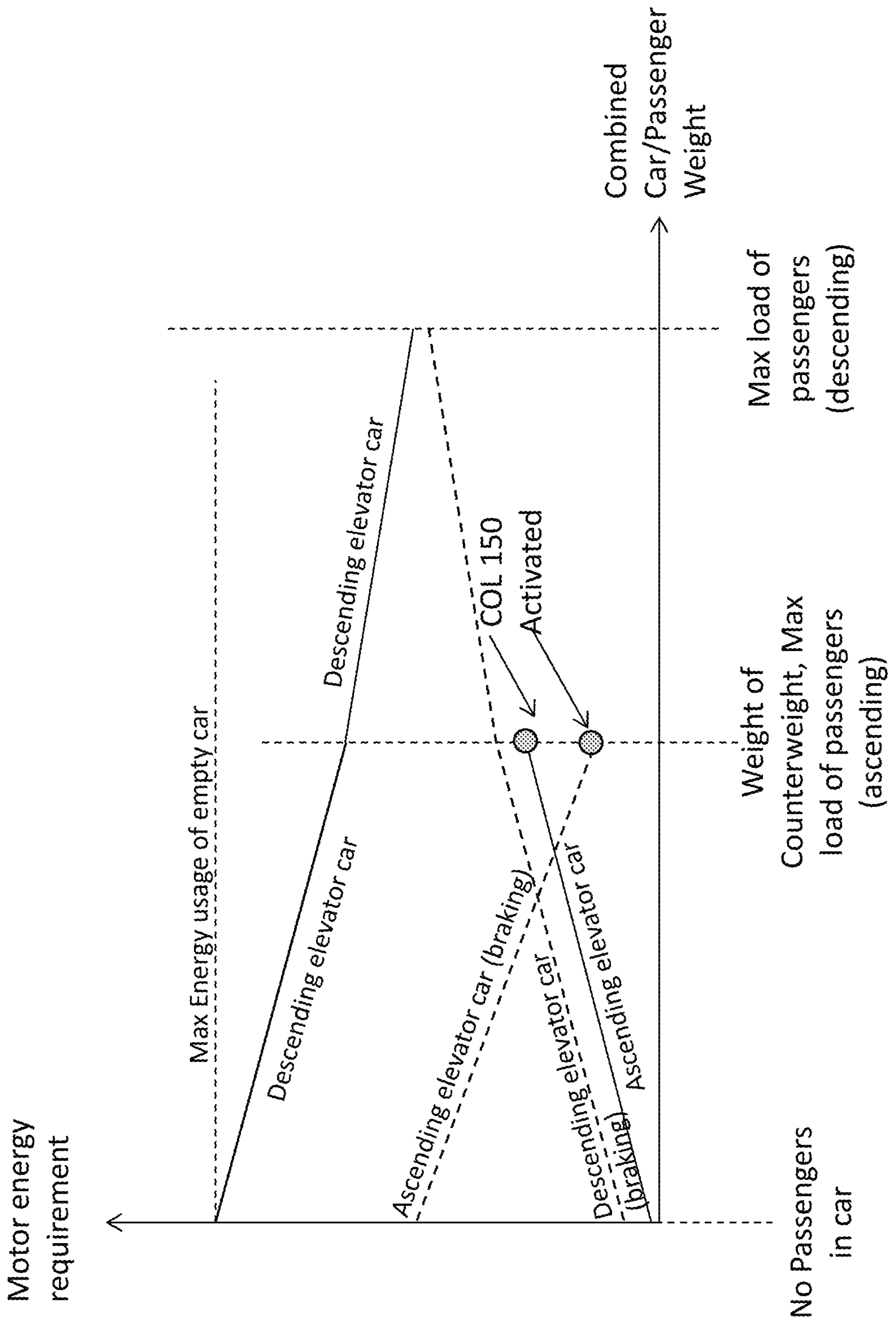
Figure 1I:
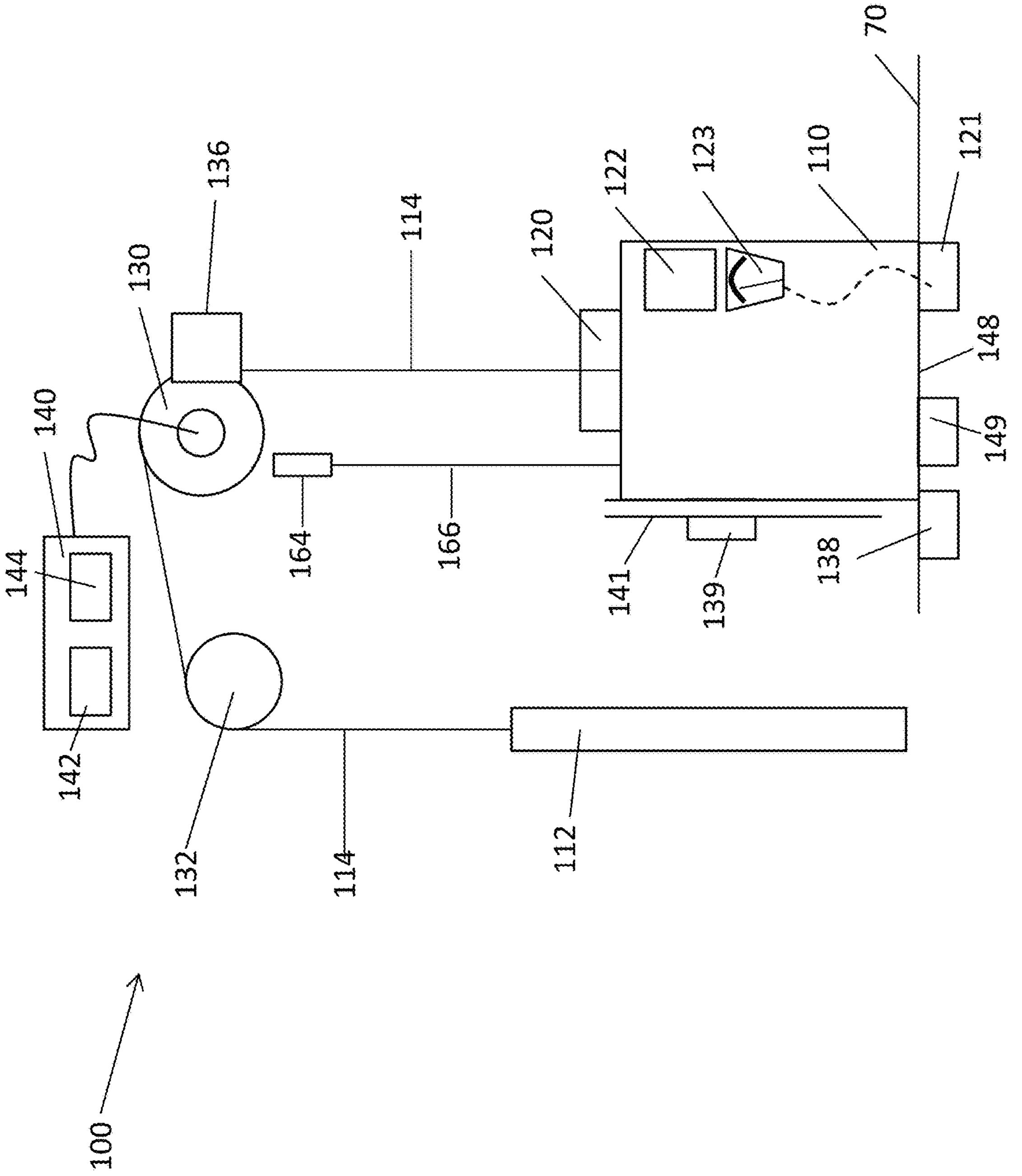
Figure 1J:
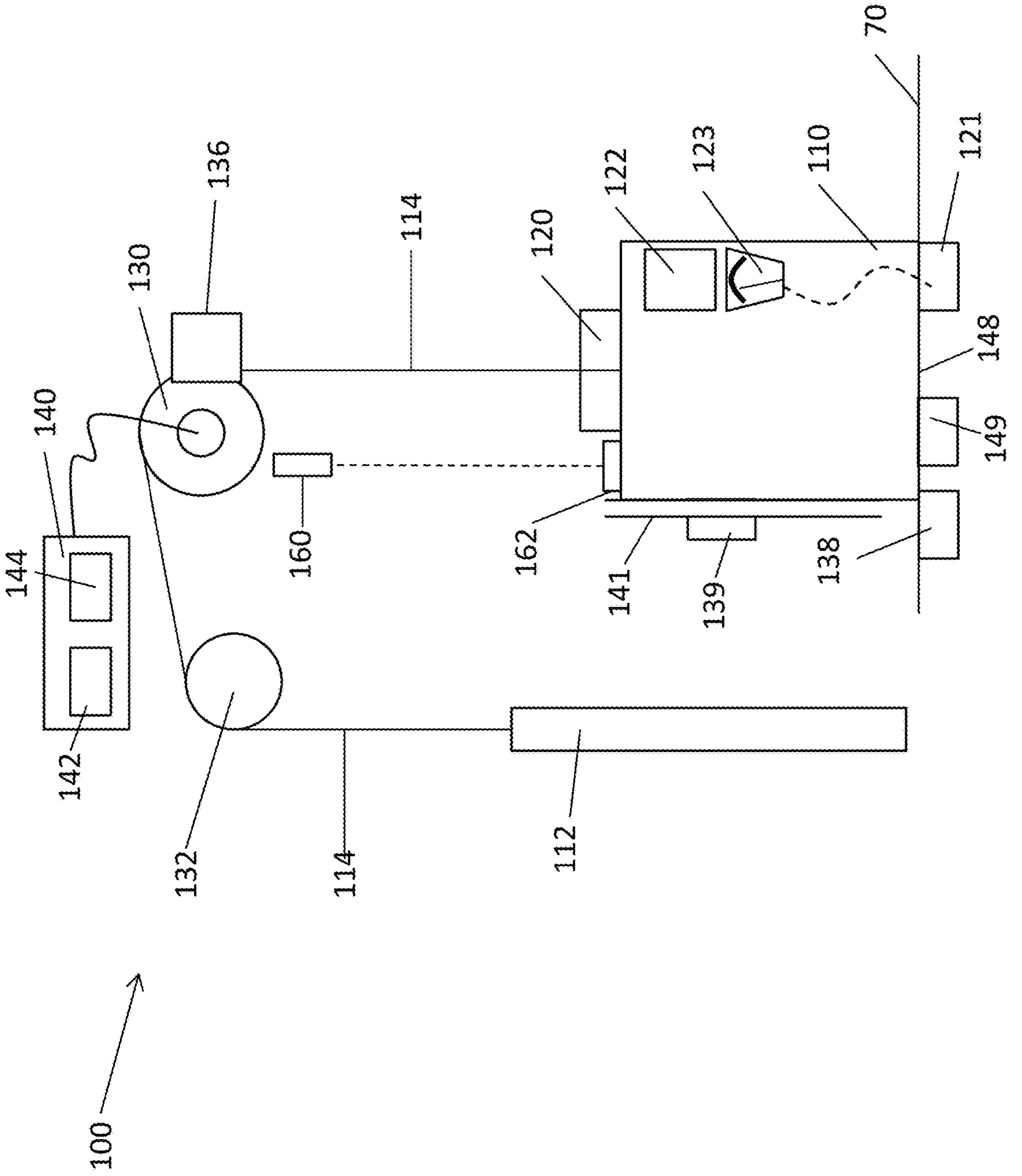

As shown in FIGS. 1I and 1J, in some embodiments, system 100 additionally or alternatively may include a distance measurement devices 160, 164 for determining the position of car 110 in a lift shaft. Distance measurement devices 160, 164 are in data communication with controller 140.

In some embodiments (FIG. 1I), system 100 includes an optical distance measurement device 160 for determining the position of car 110 in a lift shaft. In some embodiments, optical measurement device 160 includes a retroreflective sensor aimed at a car 110. In some embodiments, optical measurement device 160 includes a laser rangefinder aimed at a car 110. In some embodiments, a reflector 162 is positioned on car 110 for reflecting the emitted light from optical measurement device 160.

In some embodiments (FIG. 1J), system 100 includes a cable measuring device 164 that determines a position of the car 110 in a lift shaft by rolling/unrolling a measuring cable 166 attached at a distal end to car 110. In some embodiments, the length of measuring cable 166 is determined based on the measured electrical resistance of cable 166 where the electrical resistance changes as cable 166 is extended and retracted.

It should be appreciated that distance measurement devices 160, 164 may provide accurate positioning of car 110 in an elevator shaft and therefore in some embodiments, floor sensor mechanism 149 is not required when distance measurement devices 160, 164 are provided.

Counterweight 112 has a weight equal to the elevator car 110 weight plus the addition of a permitted load factor that is a percentage of the permitted load, usually in the range between 45-50% or any other ratio of the permitted load. The weight relationship of system 100 can therefore be expressed as:

$$A=B+Cx,$$

where: A=weight of counterweight 112, B=weight of elevator car 110, C=permitted load weight, and x=load factor. Thus, as above, x is typically between 40%-50%. As passengers 50 enter car 110, the combined weight of passengers 50 and car 110 approaches and then exceeds the weight of counterweight (CW) 112 until the maximum permitted load is reached. In normal (non-Shabbat mode) usage the power usage of motor 130 is described by the following Table 1 and FIG. 1C.

TABLE 1

| Motor Power—non-Shabbat mode | | | |
|---|---|---|---|
| | Weight | Motor 130 rotation power | Motor 130 braking power |
| Ascending | CW 112 is heavier than car 110 | More power needed as passengers enter | Less power needed as passengers enter |
| Ascending | Car 110 is heavier than CW 112 | More power needed as passengers enter | Less power needed as passengers enter |
| Descending | CW 112 is heavier than car 110 | Less power needed as passengers enter | More power needed as passengers enter |
| Descending | Car 110 is heavier than CW 112 | Less power needed as passengers enter | More power needed as passengers enter |

Thus, as shown in FIG. 1C and Table 1, ascending car 110 requires progressively more energy as passengers enter and descending car 100 requires progressively less energy as passengers enter as compared to an empty car. It should be appreciated that the slope and angle of slope of the graphs of FIG. 1C (and FIGS. 1F and 1G) are illustrative and shown as smooth but may have a stepped slope as weight changes are stepped based on entry and exit of passengers 50 each having a fixed incremental weight.

It should be appreciated that braking using motor 130 requires less energy than powered rotation of motor 130. In some embodiments, braking is performed by motor 130 alone. In some embodiments mechanical brake 136 is also used in addition to braking with motor 130. In some embodiments, braking is performed using mechanical brake 136 alone.

On the Sabbath, the system 100 makes use of a combination of means to prevent increased energy usage of motor 130. It should be appreciated that while these means as described herein are used for Sabbath mode of the elevator, that the means proposed may also be used to reduce the energy usage of an elevator. These means are controlled by controller 140. The first of the means is, by controller 140, to disable powered rotation of motor 130 for moving of car 110, and relying on gravity to pull the heavier side down, and to only use motor 130 for braking where needed.

In the second of the means, system 100 includes means for limiting occupancy of the car 110 such that the combined weight of car 110 and passengers 50 is less that the weight of counterweight 112. In some embodiments, the means includes a car occupancy limiter (COL) 150 (FIGS. 1D-1E) that deploys when Sabbath mode is activated in one or both of ascending and descending as described below. An embodiment of COL 150 as shown in FIGS. 1D-1E includes a deployable barrier 152 such as but not limited to inner doors 152 inside car 110 that close off closed part 156 of the elevator to therefore reduce the amount of occupancy area 154 that passengers 50 can occupy. The weight relationship of system 100 with COL activated can therefore be expressed as:

$$A>B+D,$$

where: A=weight of counterweight 112, B=weight of elevator car 110, D=weight of passengers 50 that can fit into occupancy area 154. As passengers 50 enter car 110 with COL 150 activated, the combined weight of passengers 50 and car 110 approaches but does not exceed the weight of counterweight 112. COL 150 thus ensures that the weight of counterweight 112 is not exceeded.

As shown in FIG. 1E, inner doors 152 are positioned in the middle of elevator car 110, but this should not be considered limiting and inner doors 152 are positioned as needed to limit the occupancy area 154 inside elevator car 110. The inner doors 152 of FIGS. 1D-1E are shown as hinged doors that swing closed but optionally any other form of inner doors 152 or deployable barrier (not shown) may be provided to serve the purpose of limiting area 154. In some embodiments, inner doors 152 are any form of door, gate or barrier and the door of the embodiment of FIGS. 1D-1E should therefore not be considered limiting. COL 150 is therefore activated as part of activation of Sabbath mode by controller 140 for system 100 as described further below.

In the third of the means, frequency controller 142 is programed to keep the energy usage below the maximum used by an empty car and also at a stable energy usage level that is adjusted according to the car 110 weight. The stable energy usage is achieved by adjusting the car speed to <=the car 110 nominal speed depending on the car weight. Nominal speed is a suitable, rounded speed value for classifying the typical speed range of car 110. In a non-limiting example, an ascending car 110 that would normally travel at a nominal speed of 5 m/s may be pulled by motor 130 at a speed of 4 m/s thus enabling continued use of motor 130 while ensuring that motor 130 energy usage does not exceed an allowable level. As the weight of car 110 increases, motor 130 uses less energy (speed is reduced) so as not to exceed the energy usage limit. In some embodiments, a point is reached where motor 130 is not used as described above aside from braking where needed.

Examples are provided below for combinations of the three means proposed herein.

In a first example, as shown in FIG. 1F and table 2, with COL 150 activated for both directions and motor 130 not used for powered ascending movement, energy usage, including braking power, does not exceed the baseline usage of an empty elevator.

TABLE 2

| Motor Power—Shabbat mode, COL activated for ascending and descending | | | |
|---|---|---|---|
| | Weight | Motor 130 rotation power | Motor 130 braking power |
| Ascending | CW 112 is always heavier than car 110 due to COL 150 | Motor 130 not used, gravity pulls CW 112 down so that car 110 ascends | Less power needed as passengers enter |
| Descending | CW 112 is always heavier than car 110 due to COL 150 | Less power needed as passengers enter and car 110 gets heavier | More power needed as passengers enter |

In a second example, as shown in FIG. 1G and Table 3, in some embodiments, COL 150 is only activated when car 110 is ascending and deactivated when car 110 is descending. With COL 150 activated for ascending only, and motor 130 not used for powered movement ascending, energy usage, including braking power, does not exceed the baseline usage of an empty elevator.

TABLE 3

| Motor Power—Shabbat mode, COL activated for ascending | | | |
|---|---|---|---|
| | Weight | Motor 130 rotation power | Motor 130 braking power |
| Ascending | CW 112 is always heavier than car 110 due to COL 150 | Motor 130 not used, gravity pulls CW 112 down so that car 110 ascends | Less power needed as passengers enter |
| Descending | CW 112 is heavier than car 110 | Motor 130 used but with less power needed as passengers enter and car 110 gets heavier | More power needed as passengers enter |
| Descending | Car 110 is heavier than CW 112 | Motor 130 not used, gravity pulls car 110 down | More power needed as passengers enter |

As shown in FIG. 1G, descending with overweight will not use more braking energy than was needed for ascending of the completely empty car due to the use of one of motor 130 braking alone, combined motor 130 and mechanical brake 136, or mechanical brake 136 alone.

In a third example, as shown in FIG. 1H and Table 4, in some embodiments, COL 150 is only activated when car 110 is ascending and deactivated when car 110 is descending. In addition, the speed of car 110 is adjusted dynamically to limit motor 130 energy usage to a stable amount less than or equal to the energy usage of an empty elevator. With COL 150 activated for ascending only, and the speed of car 110 adjusted dynamically, motor 130 energy usage, including braking power, does not exceed the baseline energy usage of an empty elevator. In some embodiments, COL is activated for both ascending and descending such that CW 112 is always heavier than (loaded) car 110.

TABLE 4

| Motor power—Shabbat mode, COL activated for ascending, car speed reduced | | | |
|---|---|---|---|
| | Weight | Motor 130 rotation power | Motor 130 braking power |
| Ascending | CW 112 is always heavier than car 110 due to COL 150 | Motor used with varying speed and stable energy usage, gravity pulls CW 112 down so that car 110 ascends | Less power needed as passengers enter |
| Descending | CW 112 is heavier than car 110 | Motor 130 used but with less power than empty needed as passengers enter and car 110 gets heavier. Also car speed reduced if needed. | More power needed as passengers enter |
| Descending | Car 110 is heavier than CW 112 (only when COL deactivated) | Motor 130 used, gravity pulls car 110 down and car speed is up to nominal speed | More power needed as passengers enter |

In some embodiments, occupancy sensor 158 is provided to detect that elevator car 110 is empty before COL 150 activates and inner doors 152 close to prevent trapping of passengers 50 inside area 156. Since occupancy sensor 158 cannot be activated when passengers are in car 110 (since those passengers 50 would then be breaking the Sabbath by activating the sensor 158), passengers 50 must first be given the opportunity to exit car 110. In some embodiments, when system 100 is about to activate COL 150, indicator 122 provides a visual indication that all passengers 50 must exit car 110. Following a waiting period sufficient for passengers to exit car 110, doors 116 are closed and occupancy sensor 158 is activated. If no passengers are detected then COL 150 is activated. If passengers 50 are detected by occupancy sensor 158 then COL 150 is not activated, doors 116 are opened and indicator 122 again provides a visual indication that all passengers 50 must exit car 110. The process is repeated until all passengers exit car 110 and COL 150 can be activated.

When Sabbath mode is activated, before the elevator doors 116 close, indicator 122 provides a visual indication that elevator doors 116 are about to close to warn passengers to step inside or stay outside of elevator car 110 and to stay away from the doors. Door close indicator 122 includes a light source in communication with the door close mechanism of elevator car 110. The light source of indicator 122 may use any lighting technology including but not limited to LED, xenon and so forth. Door close indicator is here shown inside elevator car 110 but is optionally positioned outside of car 110 or optionally duplicated and positioned both inside and outside of car 110.

Weight sensor 120 (also referred to herein as load sensor 120) operates continually regardless of the entry of passengers into elevator car 110. As a non-limiting example, the weight sensor system weighs the cabin every tenth of a second and hence does not perform any additional operation caused by the entry of a passenger 50 into elevator car 110. Weight sensor 120 determines the weight added by passengers 50. The added weight information is used by controller 140 to adjust the torque of motor 130 when motor 130 moves cable 114. In some embodiments, weight sensor 120 is disabled when Shabbat mode is activated and frequency controller 142 is used to monitor weight by sensing the weight resistance.

In some embodiments, a mechanical weight sensor 121 is provided. Mechanical weight sensor 121 provides an indication on gauge 123 of the combined weight of car 110 and passengers 50. Gauge 123 is visible to passengers 50 inside car 110 and provides a clear indication that the combined weight has exceeded or is close to exceeding the weight of counterweight 112. Passengers 50 can therefore understand that one or more passengers 50 will need to exit car 100 in cases of overweight. In some embodiments, mechanical weight sensor 121 is used as an alternative to COL 150 such that elevator doors 116 will not close when mechanical weight sensor 121 and gauge 123 shows a combined weight has exceeded or is close to exceeding the weight of counterweight 112.

In some embodiments, when operating in Shabbat mode as described herein, with COL 150 activated, motor 130 is not used for pulling car 110 upwards (see tables 2 and 3). Thus, where passengers 50 cause car 110 to be heavier than counterweight 112 during ascending of car 110 (such as by squashing too many passengers 50 into occupancy area 154), the closing of doors 116 and release of brake 136 will result in car 110 descending. On floors other than the bottom floor, height sensors will trigger a stop of car 110 at the next lowest floor. For the lowest floor there is no lower floor and therefore, in some embodiments, a boundary switch 138 is provided below the lowest floor 70 that car 110 stops at.

Where too many passengers enter car 110 in Shabbat mode and car 110 starts to descend below the lowest surface 70, boundary switch 138 will trigger controller 140 to activate motor 130 to pull car 110 back level with lowest surface 70. Once passengers 50 have excited car 110 and counterweight 112 is heavier, car 110 will be able to ascend.

As described above, when car 110 stops at a floor 70, floor sensor mechanism 149 determines whether a door threshold 148 is level with the floor 70. Alternatively, distance measurement devices 160, 164 may be used to determine that door threshold 148 is level with the floor 70. Due to the elasticity of the elevator cables 114, car 110 may subside below the floor 70 level after stopping as passengers enter car 100 resulting in motor 130 activating to pull car 110 back level. In some embodiments, system 100 therefore includes an electromagnet 139 for holding car 110 in position, level with a floor where car 110 stops. In some embodiments, the electromagnet 139 is fixedly attached to the car 110, such as to a car shoe (not shown), such that, when electromagnet 139 is energized it will engage with elevator rails 141 thus ensuring that car 110 (more specifically car door threshold 148) remains level with the floor 70 where car 110 stops. Thus, when operating in Shabbat mode as described herein, motor 130 will not need to be activated for pulling car 110 upwards when car 110 reaches a floor 70 as electromagnet 139 will prevent car 110 from subsiding below the floor 70 level. In some embodiments, electromagnet 139 is in data communication with controller 140.

In some embodiments, where passengers 50 cause car 110 with COL 150 activated to be heavier than counterweight 112 during ascending of car 110 (such as by squashing too many passengers 50 into occupancy area 154), motor 130 is activated by controller 140 to hold car 100 at the current floor, but not to power an ascent, until one or more passengers exit from car 110 such that counterweight 112 is heavier and can pull car 110 up using gravity.

In some embodiments, when in Shabbat mode, car 110 will stop at every floor (or alternate floors) while ascending, and not stop during descent in order to maximize use of gravity and inertia while preventing buildup of inertia for ascent. In some embodiments, in Shabbat mode, car 110 stops at every floor or alternate floors during descent.

Figure 2A:
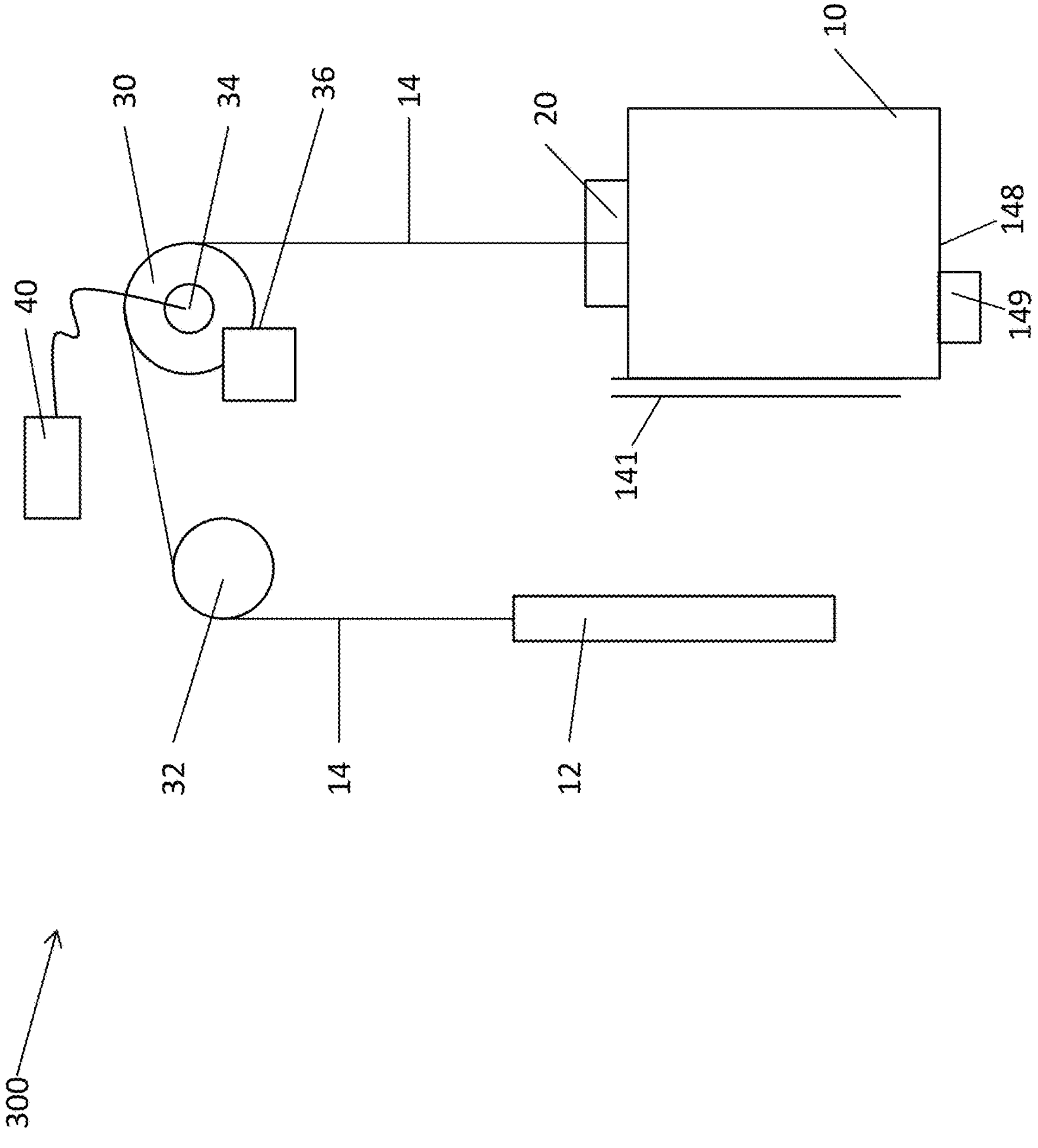
FIGS. 2A-2C are schematic diagrams of a Sabbath elevator according to at least some embodiments.
Figure 2B:
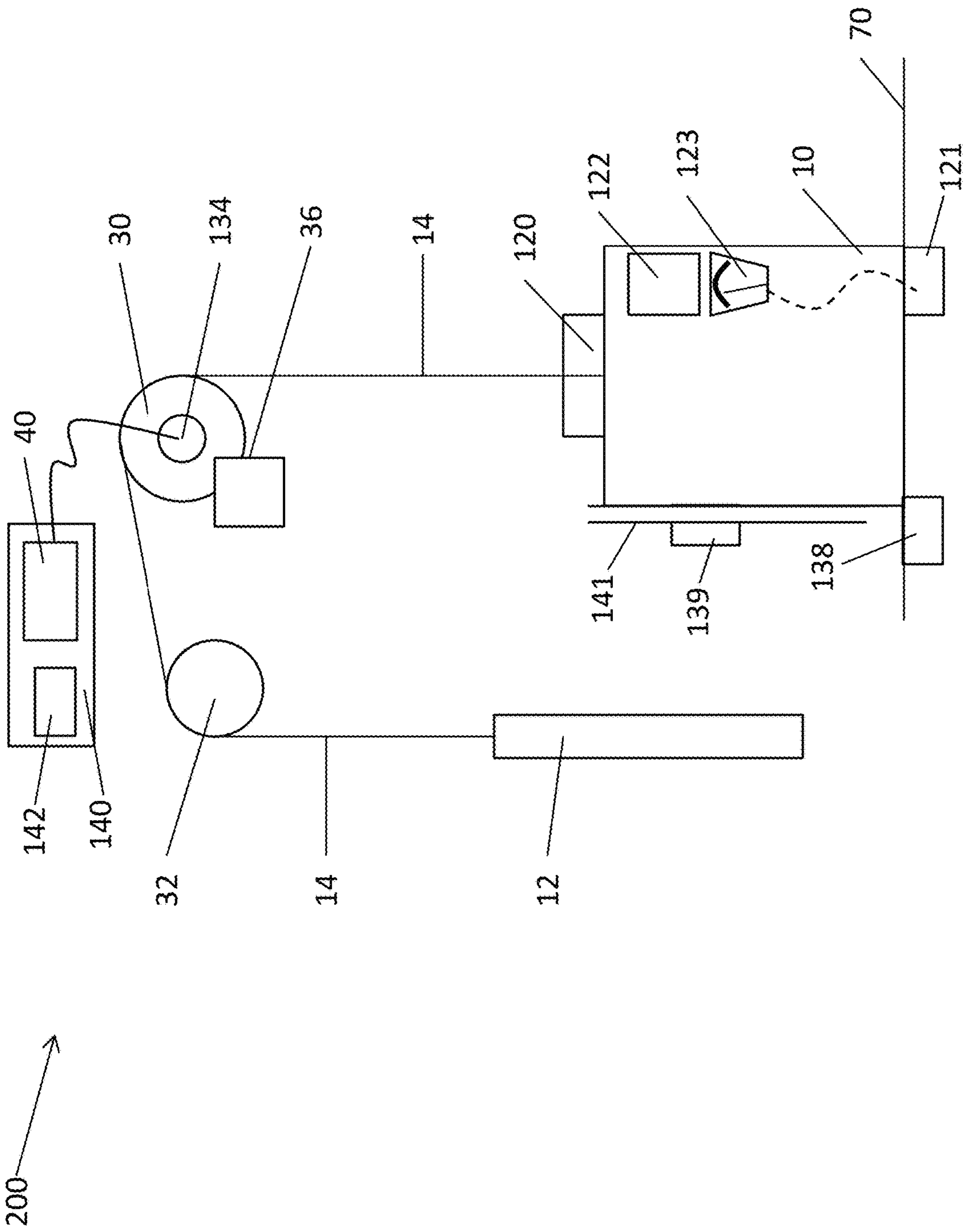
Figure 2C:
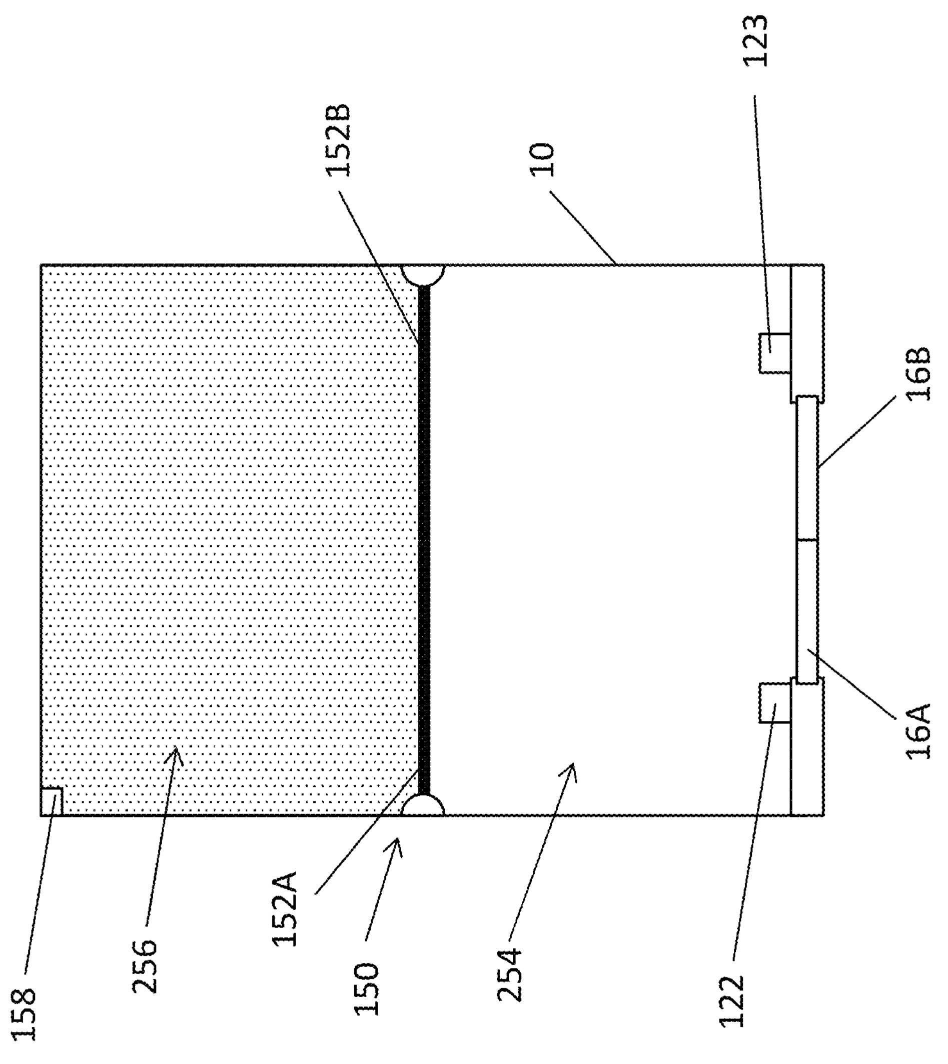

FIGS. 2A-2C show an existing elevator that is retrofit with components to create system 200 according to some embodiments. As shown in FIG. 2A, elevator system 200 includes an elevator car 10 guided by elevator rails 141 suspended by a cable 14 that passes over a motor 30 and pulley 32 and is attached on a distal side to a counterweight 12. Elevator 200 is controlled by a control panel 40. Tachometer/encoder 34 provides data about the rotation of motor 30 to control panel 40. Brake 36 provides mechanical braking of motor 30. It should be appreciated that different motor/pulley/brake arrangements are possible, and the illustrated arrangement should not be considered limiting. It should be appreciated that elevator 200 also includes other components common to elevators known in the art and only those components related to the disclosure herein are described herein. In some embodiments, elevator 200 already supports Shabbat mode, such as stopping at every or alternate floors and sounding a buzzer when the doors are about to close, but does not operate according to a Shabbat mode acceptable to all observant Jews and therefore needs upgrading as below.

For enabling Shabbat mode in accordance with the requirements as described herein, a Shabbat mode kit including one or more of the following components are added/exchanged to system 200 as shown in FIG. 2B: Controller 140 including frequency controller 142, optical tachometer 134, load sensor 120, COL 150, mechanical load sensor 121, gauge 123, boundary switch 138, electromagnet 139, distance measurement devices 160, 164 and door close indicator 122. The operation of these components is as described for the like-numbered components in the description of FIGS. 1A-1G.

Controller 140 including frequency controller 142 is connected to control panel 40 for operating of elevator system 200. In some embodiments, control panel 40 may undergo a software upgrade and with the addition of frequency controller 142 becomes controller 140. In some embodiments, an existing frequency controller 142 is used and control panel 40 undergoes a software upgrade to become controller 140. Controller 140 is adapted to interface and integrate into multiple different control panel 40 types as manufactured for different lift vendors and types of elevators. In one embodiment, controller 140 is installed into an existing elevator installation and adds functionality as described herein with reference to FIGS. 1A-1G to existing elevator 200.

Controller module 140 preferably can control and make changes to control panel 40. As a non-limiting example, controller 140 can activate or deactivate Sabbath mode, or can perform any activities that are provided via panel 40.

Controller 140 is in data communication with the added components as shown in FIGS. 2B and 2C for operation of elevator system 200 in the same way as operation of elevator 100 as described above with reference to FIGS. 1A-1G. An embodiment of COL 150 as shown in FIG. 2C includes inner doors 152 inside the car 10 that close off closed part 256 of the elevator car 10 to therefore reduce the amount of occupancy area 254 that passengers 50 can occupy. As above, other means may be provided for limiting occupancy of car 10 including mechanical weight sensor 121 or a moveable barrier.

Figure 3:
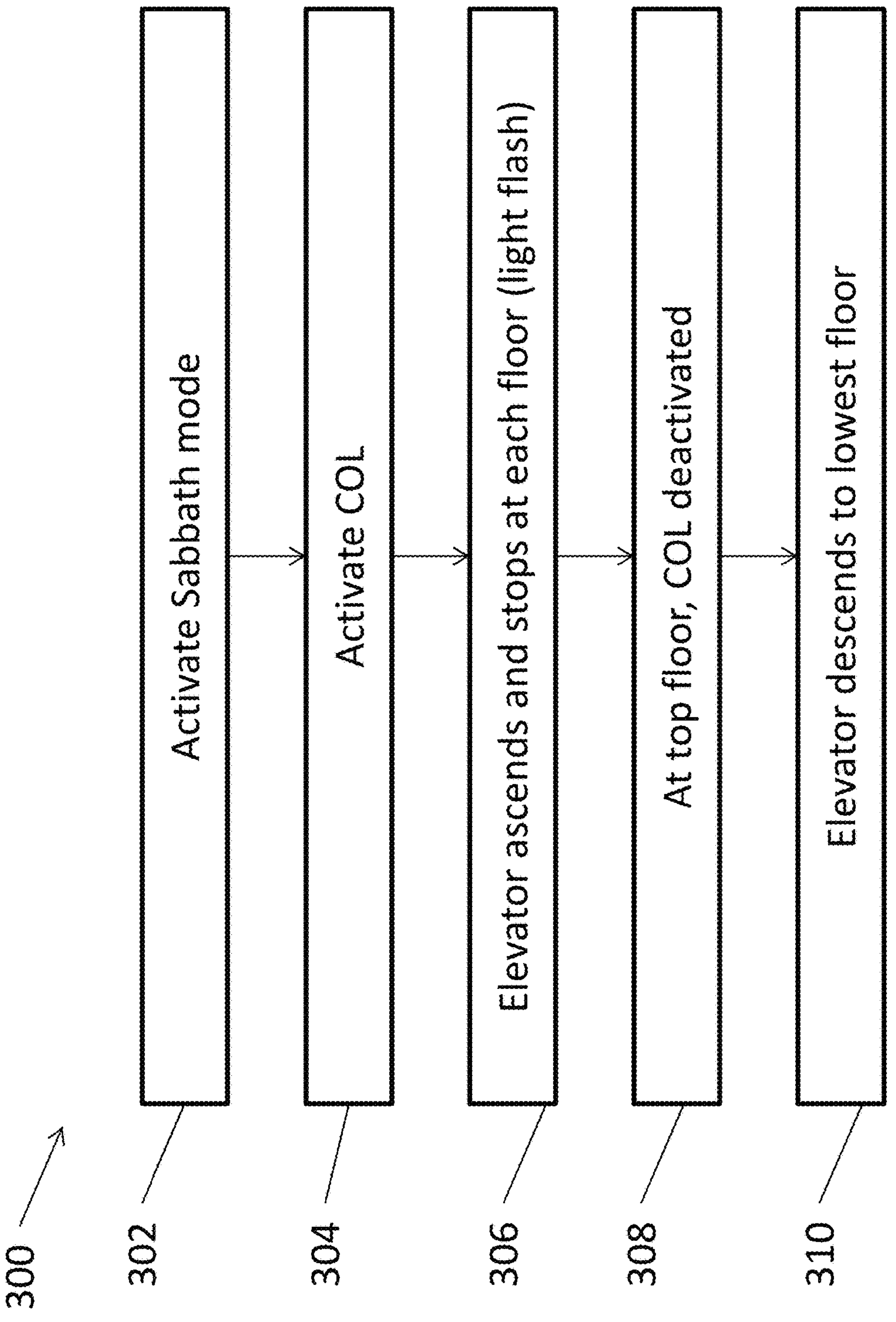
FIG. 3 is a flow diagram showing operation of a Sabbath elevator according to at least some embodiments.

Reference is now made to FIG. 3 which is a flow diagram showing operation of a Sabbath elevator according to at least some embodiments of the present disclosure. In step 302 of process 300, based on the time of day and the day of the week, and having determined that Sabbath is about to start, controller 140 activates Sabbath mode for elevator 110. In step 304 COL 150 is activated following determination by controller 140 that area 156 is empty.

In step 306, car 110 ascends, stopping at every or alternate floors. After each stop, before doors 116 close, visual indicator 122 is activated. At the uppermost floor before starting descent, in step 308, COL 150 is deactivated. In step 310, car 110 descends directly to the lowest floor. Alternatively car 110 stops at every or alternate floors during descent.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination.

Although the disclosure has been described in conjunction with specific embodiments thereof, it is evident that many alternatives, modifications and variations will be apparent to those skilled in the art. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure.

What is claimed is:

1. A method of operating an elevator, the elevator comprising an elevator car, a motor, a controller and a counterweight (CW), the method comprising:

for ascending of the elevator car when loaded with passengers, providing a car occupancy limiter (COL), activating the COL by the controller for limiting occupancy of the elevator car such that the loaded car weighs less than the CW, and controlling by the controller of the motor to not use motor rotational power, wherein gravitational pull on the CW causes the elevator car to ascend.

2. The method of claim 1, further comprising: for descending of the elevator car when loaded with passengers, wherein the loaded car weighs more than the CW, controlling by the controller of the motor to limit the motor rotational speed so as to limit the motor rotational power.

3. The method of claim 2, wherein the motor energy used in either of ascending or descending is less than the energy that would be used by an empty car.

4. The method of claim 1, wherein the COL is activated by the controller after ensuring that there are no passengers inside the car.

5. The method of claim 1, wherein the elevator comprises a weight sensor, the method further comprising, when a Shabbat mode is activated, by the controller, disabling the weight sensor or enabling the weight sensor only when car doors are closed.

6. The method of claim 1, wherein the elevator further comprises a mechanical weight sensor that provides an indication visible to the passengers of the combined weight of the car and passengers relative to the CW.

7. The method of claim 1, wherein the elevator further comprises an electromagnet and wherein the electromagnet is activated by the controller to engage with elevator rails so that an elevator door threshold will not subside under a floor level.

8. The method of claim 1, wherein the COL comprises a deployable barrier inside the elevator car for defining a limited occupancy area.

9. An elevator comprising:

an elevator car;

a counterweight (CW);

a car occupancy limiter (COL) for limiting occupancy of the elevator car such that the loaded car weighs less than the CW; and a controller controlling operation of the elevator configured such that: for ascending of the elevator car when loaded with passengers, activating the COL and not using motor rotational power or limiting the motor rotational speed so as to limit the motor rotational power, wherein gravitational pull on the CW causes or assists the elevator car to ascend.

10. The elevator of claim 9, wherein the COL comprises a deployable barrier inside the elevator car for defining a limited occupancy area.

11. The elevator of claim 9, wherein the COL further comprises an occupancy sensor.

12. The elevator of claim 9, further comprising a visual door close indicator.

13. The elevator of claim 9, further comprising a mechanical weight sensor that provides an indication visible to the passengers of the elevator of the combined weight of the car and passengers relative to the CW.

14. The elevator of claim 9, further comprising a weight sensor, wherein the controller is configured, when a Shabbat mode is activated, to disable the weight sensor or to enable the weight sensor only when car doors are closed.

15. The elevator of claim 9, further comprising an electromagnet configured to be activated by the controller to engage with elevator rails so that an elevator door threshold will not subside below a floor level.

16. The elevator of claim 9, further comprising a distance measurement device for determining the position of the car in a lift shaft.

17. The elevator of claim 16, wherein the distance measurement device is one of an optical distance measurement device, or a cable measuring device.

18. A method of operating a Sabbath elevator on the Sabbath, the Sabbath elevator comprising an elevator car, a motor, a controller, and a counterweight (CW), the method comprising: for ascending of the elevator car when loaded with passengers, providing and activating by the controller of a car occupancy limiter (COL) for limiting occupancy of the elevator car such that the loaded car weighs less than the CW and, by the controller, limiting the motor rotational speed so as to limit the motor rotational power.

19. The method of claim 18, wherein motor energy used in either of ascending or descending is less than energy that would be used by an empty car.

* * * * *